United States Patent [19]
McIntyre et al.

[11] Patent Number: 6,102,505
[45] Date of Patent: Aug. 15, 2000

[54] RECORDING AUDIO AND ELECTRONIC IMAGES

[75] Inventors: Dale F. McIntyre, Honeoye Falls; J. Kelly Lee, Rochester, both of N.Y.

[73] Assignee: Eastman Kodak Company, Rochester, N.Y.

[21] Appl. No.: 08/994,000

[22] Filed: Dec. 18, 1997

[51] Int. Cl.[7] ..................................................... B41J 3/00
[52] U.S. Cl. ........................... 347/2; 358/502; 358/906; 358/909.1
[58] Field of Search ..................... 347/2, 107; 283/72, 283/85, 88; 358/502, 527, 906, 909.1

[56] References Cited

U.S. PATENT DOCUMENTS

| | | | |
|---|---|---|---|
| 3,439,598 | 4/1969 | Weitzner et al. | 396/312 |
| 4,262,301 | 4/1981 | Erlishman | 358/6 |
| 4,270,853 | 6/1981 | Hatada et al. | 396/33 |
| 4,270,854 | 6/1981 | Stemme et al. | 396/33 |
| 4,627,819 | 12/1986 | Burrows | 434/337 |
| 4,889,367 | 12/1989 | Miller | 283/88 |
| 4,905,029 | 2/1990 | Kelley | 396/312 |
| 5,276,472 | 1/1994 | Bell et al. | 396/312 |
| 5,493,409 | 2/1996 | Maeda et al. | 358/296 |
| 5,547,501 | 8/1996 | Maruyama et al. | 106/21 R |
| 5,644,557 | 7/1997 | Akamine et al. | 369/14 |
| 5,757,388 | 5/1998 | Stephenson | 347/2 |

FOREIGN PATENT DOCUMENTS

| | | |
|---|---|---|
| 547357 | 6/1993 | European Pat. Off. . |
| 825758 | 2/1998 | European Pat. Off. . |

Primary Examiner—John Barlow
Assistant Examiner—Juanita Stephens
Attorney, Agent, or Firm—Raymond L. Owens

[57] ABSTRACT

Audio and image data are recorded on a receiver by capturing audio information and converting it to digital signals; capturing an electronic image which corresponds to the captured audio information; recording the audio information on the receiver by applying a nonvisible ink to the receiver; and recording the electronic image by applying visible ink to the receiver.

19 Claims, 5 Drawing Sheets

RECORDING AUDIO AND ELECTRONIC IMAGES

CROSS REFERENCE TO RELATED APPLICATIONS

The present invention is related to commonly assigned U.S. Pat. No. 5,757,388 filed, entitled "Electronic Camera and Integral Ink Jet Printer" to Stephenson. The disclosure of this related application is incorporated herein by reference.

FIELD OF THE INVENTION

This invention relates to the field of electronic still cameras and more particularly to electronic still cameras which have an integral printer capable of printing audio and visual information.

BACKGROUND OF THE INVENTION

Systems for providing audio recording and playback in association with individual electronic still prints are known in the art Examples of such systems are disclosed in U.S. Pat. No. 3,439,598; 4,270,853; 4,270,854; 4,905,029; and 5,276,472. In the '598 patent, a belt driven recording needle inscribes audio information in spiral grooves on the back layer of a multi-laminate slide film. This requires special film and film processing that would allow for removal of the recording film laminate and its attachment to the slide frame for playback by needle-based playback apparatus. In the '854 patent, sound is recorded on an instant print by placing the print, after it has been ejected, into an auxiliary slot in the camera and then proceeding to record the audio on a magnetic strip on the print border. With this system, audio can only be recorded after the picture has been captured and only on an instant print. Also, the only way disclosed for playback is with the camera. The '853 patent discloses a similar apparatus for an instant print camera for recording audio on a magnetic strip in the margin of the instant print paper within a film pack. The '029 patent discloses a microphone and tape recording mechanism to record sound in the camera which is then recorded onto a separate magnetic strip by means of separate recording/playback apparatus. The strip may then be adhesively applied to the print or to the album page adjacent the print and the sound reproduced by means of a special playback apparatus with a reciprocating playback head which is placed against the strip. This arrangement requires a separate tape recording mechanism in the camera. The '472 patent discloses the recording of digital audio information on a magnetic layer formed on a film. The digital audio information is in the form of a barcode.

Additionally, there are three known commercially available systems for combining sound with still photographs. One is the "Talking Picture Frame" sold by Talking Pictures, Inc. which utilizes a special picture frame having a voice recording IC to record the sound in RAM chips in the frame. When the frame is lifted, a microswitch activates the IC to playback the recorded sound.

Another system is the "Mini Box Comm" sold by Foto-Fonics, Inc. which utilizes a separate record/playback box to record sound on an adhesively backed strip adhered to the print. The print is inserted into the box for recording and playback and the print is in motion during both modes of operation. The third system is the Mavica electronic camera sold by Sony Corporation which is an electronic camera as opposed to a electronic film camera. Images are acquired by electronic sensors for recording on 2.5" floppy disc memories for subsequent readout by electronic visual display means. Sound is recorded on the floppy disc for subsequent playback along with the recorded image.

A problem with the photographic film systems described above is that the magnetic strips, if kept integral with the prints, are limited to use with instant print cameras. In the '854 patent, the sound must be written in a separate step involving the camera user which is a uncontrolled variable in providing the benefit as described. In the case of the system described in U.S. Pat. No. 4,905,029, the sound is recorded on separate strips that may become lost or not easily associated with the prints when they are returned from the photofinisher. In the case of the picture frame the sound is recorded after the print is returned from the photofinisher thus losing the benefit of sound recorded at the time the picture is taken.

SUMMARY OF THE INVENTION

It is an object of the invention to provide audio and visual information on a receiver produced by a printer in an electronic camera.

This object is achieved by a method of recording audio and image data on a receiver comprising the steps of:
a) capturing audio information and converting it to digital signals;
b) capturing an electronic image which corresponds to the captured audio information;
c) recording the audio information on the receiver by applying a nonvisible ink to the receiver; and
d) recording the electronic image by applying visible ink to the receiver.

DETAILED DESCRIPTION OF THE INVENTION

Figure 1:
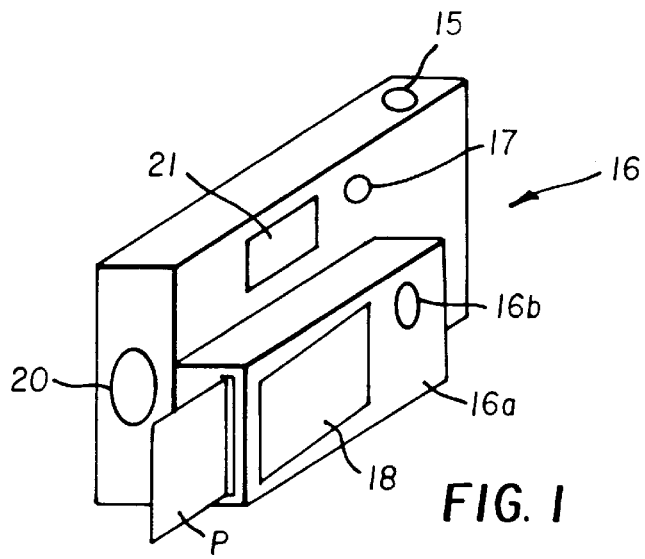
FIG. 1 is a schematic illustration of an electronic camera with an integral printer for recording audio and visual information according to the present invention.
Figure 4A:
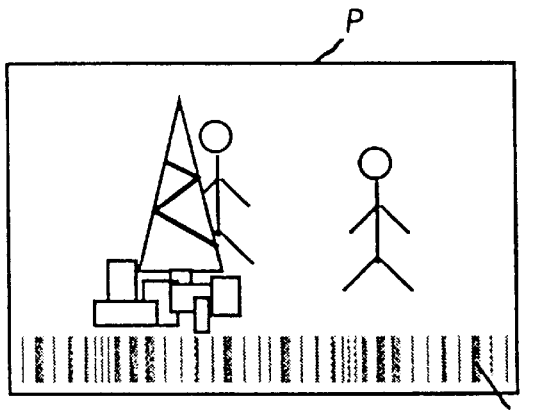
FIGS. 4a, 4b, and 4c are illustrations of a receiver illustrating different locations of the barcode.
Figure 4B:
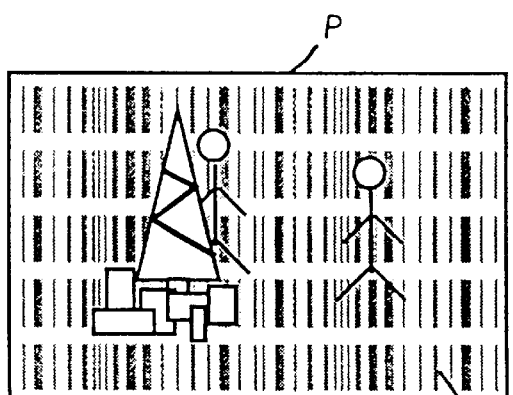
Figure 4C:
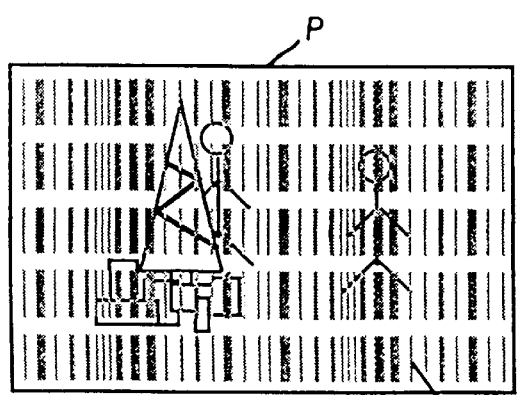

Referring to FIG. 1, an electronic camera 16 with an integral printer 16a is shown which is specifically adapted to capture an electronic image by an image sensor 14 (see FIG. 3) and print such an image. The integral printer 16a may, for example, be an inkjet printer which is adapted to record images but also print a barcode format on receiver P such as shown in FIGS. 4a, 4b, and 4c. Electronic camera 16 is provided with a built-in audio transducer, e.g. microphone 17, a shutter button 15, and a miniature speaker 20. The shutter button 15 can take many forms known in the art, such as the two position switch which can, in the first position, provide an auto focus activation and, in the second position, activate the camera shutter (not shown) to capture an image.

The electronic camera 16 is provided with a viewfinder 21 and will be understood to include the conventional elements found in electronic cameras. A receiver or print "P" is produced by the integral printer 16a. A liquid crystal display (LCD) 18 is mounted on the integral printer 16a. After a user views the image on the LCD 18 and finds it acceptable, the user actuates the integral printer 16a by depressing a print button 16b.

Figure 2:
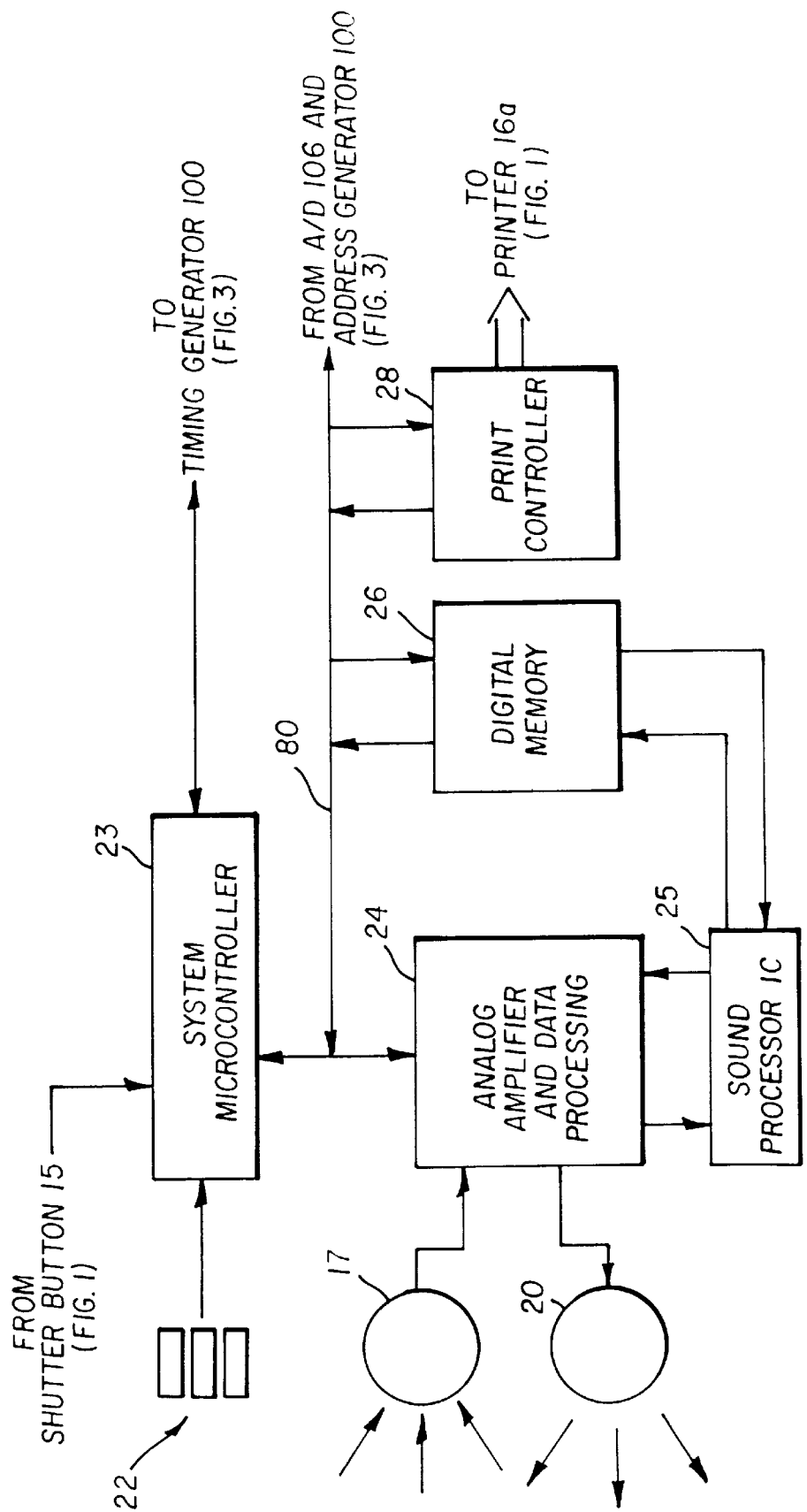
FIG. 2 is a schematic block diagram of audio recording and reproducing circuits useful in the camera of FIG. 1.

Referring to FIG. 2, there is shown an expanded block diagram of the circuits and components included in the audio recording and reproducing circuits of electronic camera 16. Buttons or switches 22 permit a user to provide inputs into a system microcontroller 23 which condition the system microcontroller 23 to initiate and control the various operating functions of the electronic camera 16. Among these functions are the sound recording and playback functions of the present invention. Moreover, the system microcontroller 23 also responds to the camera shutter button 15 to cause the capture of an image on an image sensor 14 as is well known in the art. Microphone 17 and speaker 20 are coupled to analog amplifier and data processing circuit 24 to input and play back the audio. A sound processor integrated circuit (IC) 25 serves to convert analog signals input from microphone 17 into coded digital information suitable for storage in a digital memory 26 and for converting the digital information into analog signals suitable for playback through speaker 20. Sound processor IC 25 may be a Texas Instruments TMS3477 and digital memory 26 may be a random access memory (RAM) such as a Hitachi HM628128. One of the functions of digital memory 26 is to serve as a temporary storage location for the sound data associated with an individual captured image. Also shown is system bus 80 which shown simplistically for clarity carries both address and data to all attached devices.

Figure 3:
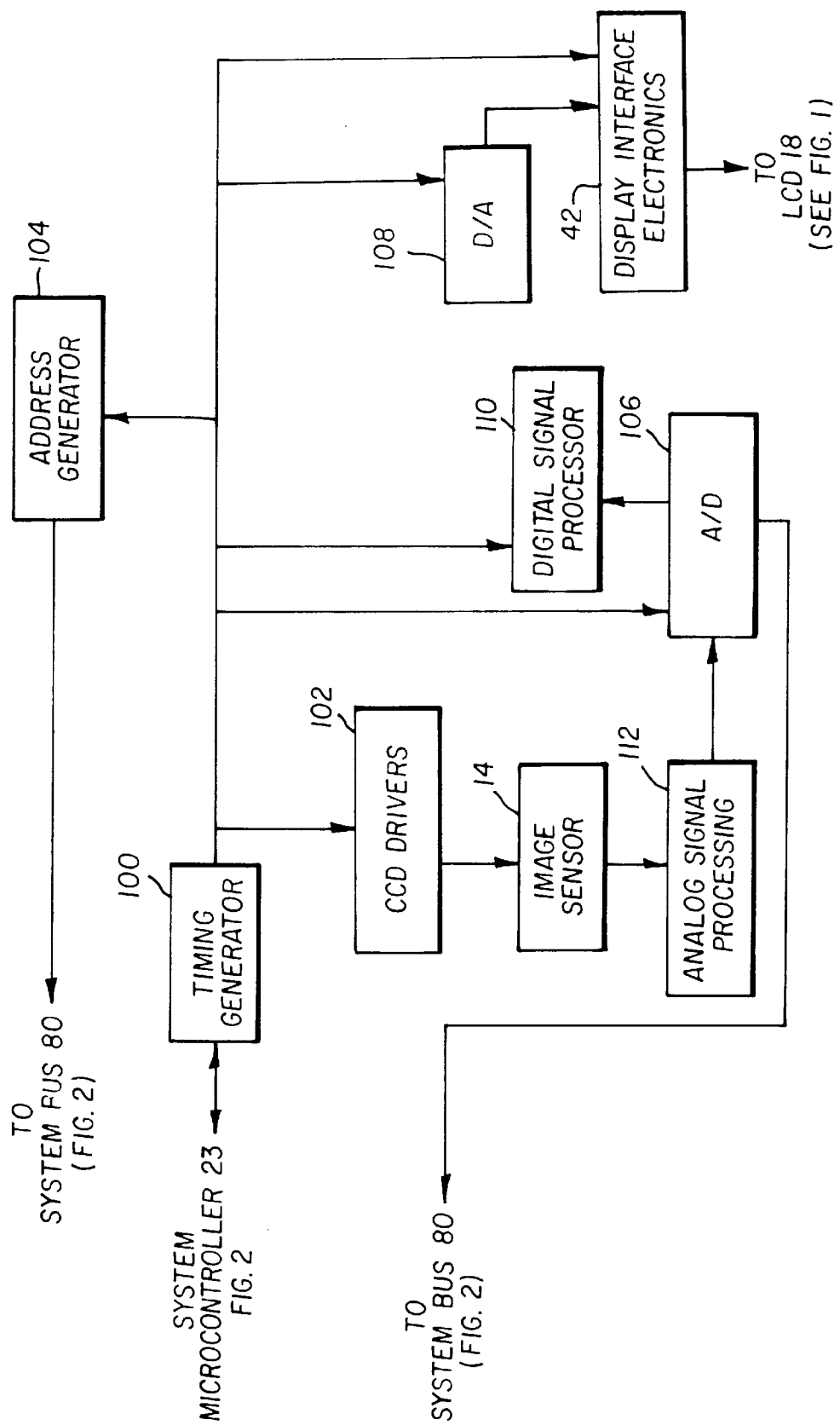
FIG. 3 is a schematic block diagram of control circuitry for operating the image sensor of the electronic camera.

Referring to FIG. 3, a schematic block diagram of the control circuitry for operating the image sensor 14 with the system microcontroller 23 is shown. Conditioned by the system microcontroller 23, timing generator 100 activates the logical sequencing of timing signals used to control the devices necessary to electronically capture an image. In order to operate the image sensor 14 which typically can be a Charge Coupled Device (CCD), CCD drivers 102 receive signals from timing generator 100 which cause the generation of appropriate clocking signals that control the image integration time and data clocking of the image sensor 14. As image data is clocked out of image sensor 14, it is subject to the analog signal processing 112 which can include a conventional correlated double sample and hold circuit which stabilizes the image data against known references before conversion to representative image data digital signals. The image data digital signals are then sent to digital memory 26 (which stores the electronic image) via system bus 80 as controlled by address generator 104. To display the captured image on LCD 18, address generator 104 working in conjunction with timing generator 100 cause the image data digital signals to be processed by digital signal processor 110. Digital signal processor 110 is known to subsample the image data digital signals to a resolution suitable for display on LCD 18. The subsampled image data digital signals are then further processed by digital-to-analog (D/A) converter 108 into analog signals which when received by display interface electronics 42 cause the image data signals to be displayed by LCD 18. Display interface electronics 42, for example, contain the necessary elements to obtain a signal compatible with LCD 18 which usually takes the NTSC format well known in the art.

Referring back to FIG. 2 when it is desired to record sound in association with taking a picture, the camera user selects sound recording via a user input selector switch 22 that causes the system microcontroller 23 to set the digital memory 26 to the "write" mode and then enables the analog amplifier and data processing circuit 24 for audio recording. Assuming the user desires to have image related audio, the user talks into the camera microphone 17 to identify the scene with appropriate information such as date, time, f-stop, shutter speed, picture taking location, people in the scene, or aims the microphone to record live sounds from the scene. The data processing circuit 24 and sound processor IC 25 convert the incoming analog signal to coded digital data which is then stored in the digital memory 26. Audio may be recorded and stored in digital memory 26 in this manner before, during or after the picture-taking event.

Once having stored the audio in digital memory 26, the stored audio information can be reviewed by playing the stored information via speaker 20 in the camera. To do this, the user selects the "review" mode by means of a user input switch 22 which causes the microcontroller 23 to set the digital memory 26 to the "read" mode thereby enabling the sound processor IC 25 and the analog amplifier and data processing circuit 24 to play back audio through speaker 20. If the recorded sound is not satisfactory, the user can easily change it by simply repeating the recording process described above. It is thus apparent that the use of this digital memory 26 allows quick audio review and, if necessary, re-recording.

The electronic camera 16 operates in two different modes. In the first mode, after the shutter button 15 is depressed, an image is captured and displayed on LCD 18. The user then decides if he or she is going to record audio information by depressing the appropriate switch 22. The audio information is stored in digital memory 26. Thereafter, the user causes the receiver P to be made by depressing print button 16b which provides a signal to the printer controller 28. The printer controller 28 is also adapted to receive the captured digital image from the image sensor 14 and to apply such digital image to the integral printer 16a.

In the second mode, the user desires to simultaneously capture audio information and record a picture. This is accomplished by conditioning the camera system microcontroller 23 by an appropriate input from one of the switches 22. In this case, the audio information will begin to be recorded directly onto a receiver when the shutter button 15 is activated to a first position. The image is captured upon activation of shutter button 15 to a second position. The total available recording time is fixed, for example, at 10 seconds. The audio recording and direct printing occurs for the 10 seconds simultaneously following the activation of shutter button 15.

As has been described above, the integral printer 16a can be an inkjet printer which can record digital images and barcode data corresponding to audio information. The system microcontroller 23 shown in FIG. 2 can cause various different formats to be used which will be discussed in connection with FIGS. 4a, 4b, and 4c. The barcode information is recorded by the inkjet printer as an ink responsive to light in the infrared (IR) portion of the spectrum. Non-visible IR responsive inks can be used in accordance with the present invention. For examples of dyes that can be dispersed in a liquid medium and are responsive to light in the infrared portion of the spectrum and can be used by an inkjet printer, see U.S. Pat. No. 5,691,114, columns 9 and 10.

Turning now to FIGS. 4a, 4b, and 4c which are illustrations of a receiver illustrating different locations of the barcode. FIG. 4a depicts a situation where the barcode 45 is provided along the margin or one of the edges of the receiver P. As shown in FIGS. 4b and 4c, the barcode 45 is recorded in tracks over the entire image. In FIG. 4b, the barcode 45 corresponding to the audio information was first recorded prior to the recording of the image. In FIG. 4c, the barcode 45 was recorded after the image was recorded.

Having recorded digital audio signals on the receiver as described above, the sound subsequently may be reproduced by means of a portable, handheld playback device 50 shown in FIG. 5 having a form factor about the same as a credit card and only slightly thicker. Such a device comprises a button battery power source 51, a memory storage IC 52, an optical IR emitter/detector pair 53, a sound data decoder IC 54, a planar speaker 55, analog drive circuits 56, and digital control logic unit 57.

Figure 5:
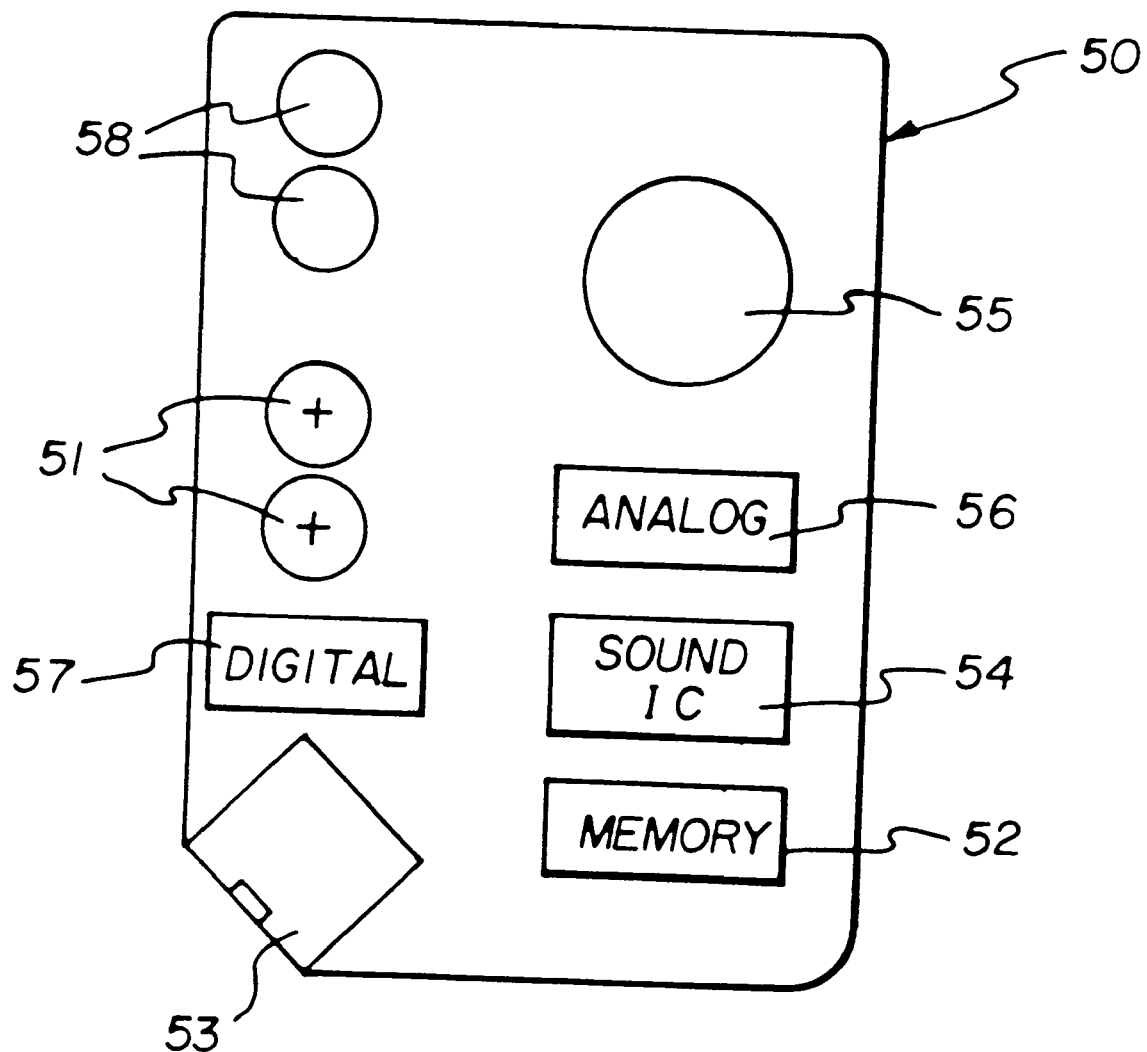
FIG. 5 is a simplified diagram of hand-held apparatus for reading audio digital signals recorded on the receiver of FIGS. 4a, 4b, or 4c.
Figure 6:
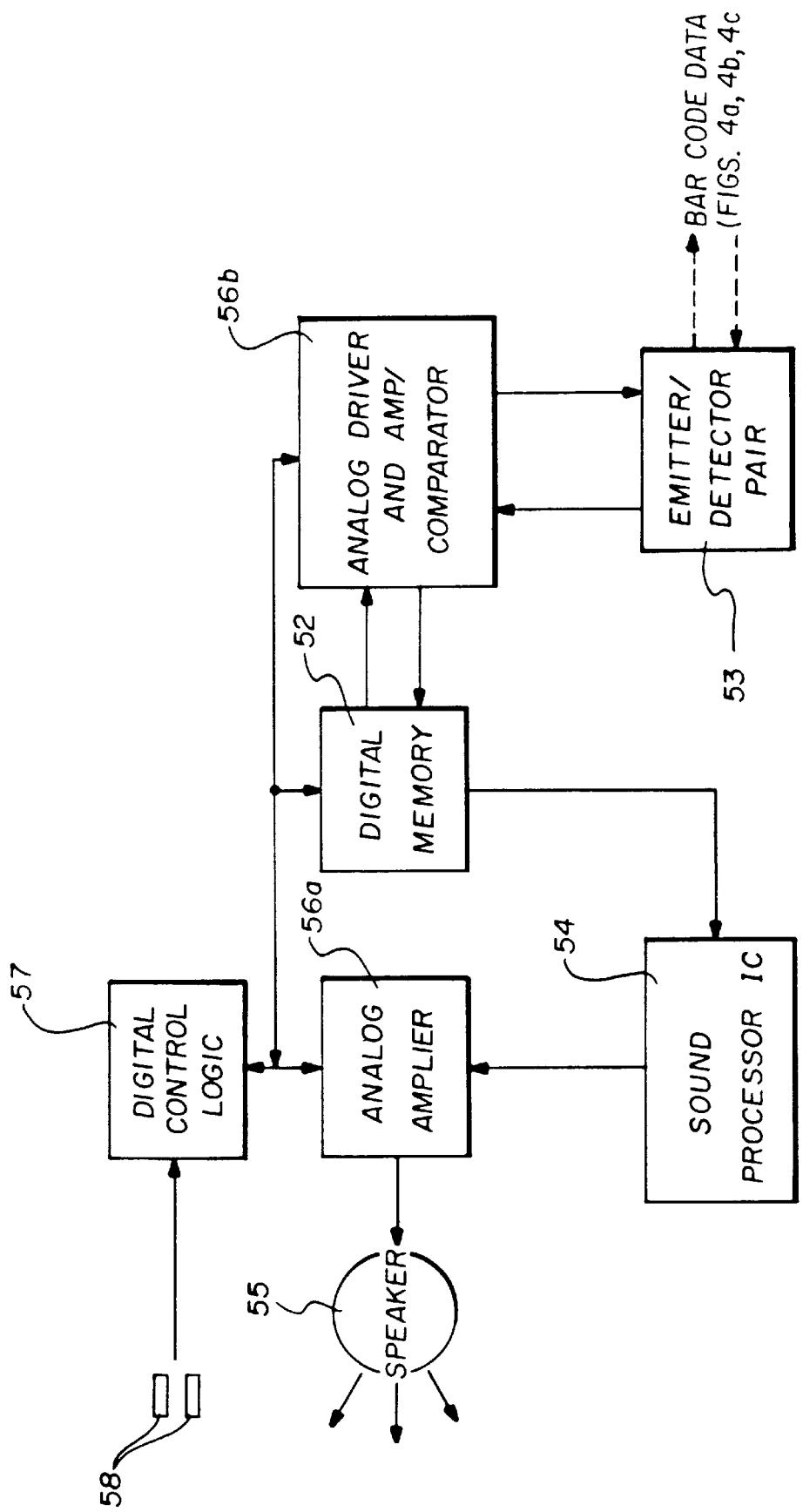
FIG. 6 is a schematic diagram of playback circuits useful in the hand-held apparatus of FIG. 5.

Referring to FIG. 6, functional block diagram of circuitry for the device of FIG. 5 comprises user input buttons 58 coupled to digital control logic unit 57 which controls the operation of sound data decoder IC 54 and an analog drive circuits 56 which includes speaker amplifier 56a and analog drive and amplitude comparator unit 56b. The latter unit is coupled to the optical IR emitter/detector pair 53 which operates to sense the recorded barcode audio digital signals on the receiver (see FIGS. 4a, b, and c) and to produce a digital output signal which is temporarily stored in memory storage IC 52. To play back the audio from the recorded audio digital signals on the print, the user enables the hand held reader by pressing an "on" switch of user input buttons 58 which causes digital control logic unit 57 to set memory storage IC 52 to the "store" mode and also to enable an LED (not shown) to indicate the "power on" status. Next the user scans the optical emitter of optical IR emitter/detector pair 53 over the encoded audio information shown as a barcode pattern. Preferably the data is encoded in a self-clocking format such as is described in U.S. Pat. No. 4,876,697 or in U.S. Pat. No. 4,954, 825, the disclosures of which are incorporated herein by reference, in order to make the reader scanspeed tolerant. While scanning, the unit decodes the printed pattern back into digital data and stores it in the local memory. Once scanned, the receiver is held in a comfortable manner to be observed while the audio player input switch is activated. The digital control logic unit 57 then proceeds to set the memory storage IC 52 to read, and to enable the sound data decoder IC 54 to convert the digital signal data to an audio signal which is passed via the amplifier to the speaker. A particular advantage of such an arrangement is that the user can replay the audio as many times as desired without re-scanning the print, since the data is retained in the digital memory storage IC 52 until power is removed or until the user clears the memory via the user input buttons 58 and digital control logic unit 57.

The invention has been described in detail with particular reference to certain preferred embodiments thereof, but it will be understood that variations and modifications can be effected within the spirit and scope of the invention.

PARTS LIST

P receiver or print
14 image sensor
15 shutter button
16 electronic camera
16a integral printer
16b print button
17 microphone
18 liquid crystal display
20 speaker
21 viewfinder
22 buttons or switches
23 microcontroller
24 data processing circuit
25 sound processor integrated circuit
26 digital memory
28 printer controller
42 display interface electronics
45 barcode
50 hand-held playback device
51 button battery power source
52 memory storage IC
53 optical IR emitter/detector pair
54 sound data decoder IC
55 planar speaker
56 analog drive circuits
56a speaker amplifier
56b amplitude comparator unit
57 digital control logic unit
58 user input buttons
80 system bus
100 timing generator
102 CCD drivers
104 address generator
108 digital-to-analog (D/A) converter
110 digital signal processor
112 analog signal processing

What is claimed is:

1. A method of using an electronic camera which includes a printer for recording audio and image data on a receiver comprising the steps of:
    a) capturing audio information and converting such captured audio information into digital signals;
    b) capturing an electronic image which corresponds to the captured audio information;
    c) recording the audio information on the receiver by causing the printer to apply a nonvisible ink to the receiver; and
    d) recording the electronic image by causing the printer to apply visible ink to the receiver.

2. The method of claim 1 wherein the nonvisible ink is an IR responsive ink.

3. The method of claim 1 wherein a plurality of colored inks are recorded on the receiver which correspond to the electronic image.

4. The method of claim 1 wherein the recorded audio digital signals are barcodes recorded in an area of the receiver as is the recorded visual image.

5. A method of using an electronic camera which includes a printer for recording audio and image data on a receiver comprising the steps of:
    a) capturing audio information and converting such captured audio information into digital signals;
    b) capturing an electronic image which corresponds to the captured audio information;
    c) first recording the audio information on the receiver by causing the printer to apply an IR responsive ink to the print; and
    d) after application of the IR responsive ink, recording the electronic image by causing the printer to apply visible ink to the print.

6. The method of claim 5 wherein a plurality of colored inks are recorded on the receiver which correspond to the electronic image.

7. The method of claim 5 wherein the recorded audio digital signals are barcodes recorded in an area of the receiver as is the recorded visual image.

8. A method of using an electronic camera which includes a printer for recording audio and image data on a receiver comprising the steps of:
   a) capturing audio information and converting such captured audio information into digital signals;
   b) capturing an electronic image which corresponds to the captured audio information;
   c) first recording the electronic image on the receiver by causing the printer to apply colored inks to the print; and
   d) after reviewing the recorded visible image, causing the printer to apply nonvisible ink to the receiver corresponding to the audio digital signals.

9. The method of claim 8 wherein a plurality of colored inks are recorded on the receiver which correspond to the electronic image.

10. The method of claim 8 wherein the recorded audio digital signals are barcodes recorded in an area of the receiver as is the recorded visual image.

11. The method of claim 10 wherein the barcode is recorded in a plurality of spaced tracks on the receiver.

12. The method of claim 8 wherein the barcode is recorded near at least one edge of the receiver.

13. In an electronic camera which includes a printer for recording audio and image data on a receiver the improvement comprising:
   a) means for capturing audio information and converting such captured audio information into digital signals;
   b) means for capturing an electronic image which corresponds to the captured audio information; and
   c) control means responsive to the audio digital signals and the captured electronic image for causing the printer to record audio information on the receiver by applying an IR responsive ink to the receiver and record the electronic image by applying visible ink to the receiver.

14. The electronic camera of claim 13 wherein a plurality of colored inks are recorded on the receiver which correspond to the electronic image.

15. The electronic camera of claim 13 wherein the recorded audio digital signals are barcodes recorded in an area of the receiver as is the recorded visual image.

16. The electronic camera of claim 13 wherein the barcode is recorded in a plurality of spaced tracks on the receiver.

17. The electronic camera of claim 13 wherein the barcode is recorded near at least one edge of the receiver.

18. The electronic camera of claim 13 wherein the control means first causes the audio digital signals to be applied to the receiver and thereafter causes the visible ink to be applied to the receiver.

19. The electronic camera of claim 13 wherein the control means first causes the visible ink to be applied to the receiver where a user can preview the image and then causes the audio digital signals to be applied to the receiver.

* * * * *